(12) United States Patent
Lustig et al.

(10) Patent No.: US 10,382,683 B2
(45) Date of Patent: *Aug. 13, 2019

(54) IMAGE ALIGNMENT USING A VIRTUAL GYROSCOPE MODEL

(71) Applicant: GoPro, Inc., San Mateo, CA (US)

(72) Inventors: Ryan Lustig, Encinitas, CA (US); Balineedu Chowdary Adsumilli, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/967,364

(22) Filed: Apr. 30, 2018

(65) Prior Publication Data

US 2018/0316861 A1    Nov. 1, 2018

Related U.S. Application Data

(63) Continuation of application No. 15/249,347, filed on Aug. 26, 2016, now Pat. No. 9,961,261.

(Continued)

(51) Int. Cl.
*H04N 5/232*        (2006.01)

(52) U.S. Cl.
CPC ....... *H04N 5/23258* (2013.01); *H04N 5/2328* (2013.01); *H04N 5/23267* (2013.01)

(58) Field of Classification Search
CPC .......... G08B 13/19608; G08B 13/1961; G06F 17/30598; A61B 2034/2065; H04N 5/144;
(Continued)

(56) References Cited

U.S. PATENT DOCUMENTS

| | | | |
|---|---|---|---|
| 5,262,856 A | 11/1993 | Lippman | |
| 6,263,088 B1 * | 7/2001 | Crabtree | G01S 3/7865 348/169 |

(Continued)

OTHER PUBLICATIONS

Achanta R., et al., 'Slic Superpixeis Gompared to State-of-The-Art Superpixei Methods,' IEEE Transactions on Pattern Analysis and Machine intelligence, 2012, vol. 34 (11), pp. 2274-2282.

(Continued)

*Primary Examiner* — Chia Wei A Chen
(74) *Attorney, Agent, or Firm* — Gazdzinski & Associates, PC (57) ABSTRACT

A target image captured from a fisheye lens or other lens with known distortion parameters may be transformed to align it to a reference image. Corresponding features may be detected in the target image and the reference image. The features may be transformed to a spherical coordinate space. In the spherical space, images may be re-pointed or rotated in three dimensions to align all or a subset of the features of the target image to the corresponding features of the reference image. For example, in a sequence of images, background features of the target image in the spherical image space may be aligned to background features of the reference image in the spherical image space to compensate for camera motion while preserving foreground motion. An inverse transformation may then be applied to bring the images back into the original image space.

20 Claims, 9 Drawing Sheets

Related U.S. Application Data (60) Provisional application No. 62/352,530, filed on Jun. 20, 2016.

(58) Field of Classification Search
CPC ............. H04N 5/23238; H04N 5/2259; H04N 5/2628; G06T 7/20; G06T 7/2006; G06T 7/2033; G06T 7/204; G06T 3/0018; G06T 3/0062; G06T 3/0012; G06T 7/2066
See application file for complete search history.

(56) References Cited

U.S. PATENT DOCUMENTS

| | | | |
|---|---|---|---|
| 6,400,846 B1 * | 6/2002 | Lin | G06T 7/20 348/252 |
| 8,395,657 B2 | 3/2013 | Jacob | |
| 8,606,073 B2 | 12/2013 | Woodman | |
| 9,070,285 B1 | 6/2015 | Ramu | |
| 9,171,577 B1 | 10/2015 | Newman | |
| 9,652,856 B2 | 5/2017 | Takenaka | |
| 9,681,111 B1 | 6/2017 | Newman | |
| 2003/0007567 A1 | 1/2003 | Newman | |
| 2003/0234866 A1 | 12/2003 | Cutler | |
| 2009/0231447 A1 | 9/2009 | Paik | |
| 2011/0018964 A1 | 1/2011 | Krishnan | |
| 2011/0206124 A1 * | 8/2011 | Morphet | H04N 5/145 375/240.16 |
| 2013/0100132 A1 | 4/2013 | Katayama | |
| 2014/0071227 A1 | 3/2014 | Takenaka | |
| 2014/0132788 A1 | 5/2014 | Ramsay | |
| 2014/0139680 A1 * | 5/2014 | Huang | G06K 9/6267 348/159 |
| 2014/0210940 A1 | 7/2014 | Barnes | |
| 2014/0240541 A1 | 8/2014 | Kim | |
| 2014/0267593 A1 | 9/2014 | Kim | |
| 2015/0213702 A1 * | 7/2015 | Kimmel | G08B 21/043 382/103 |
| 2015/0324656 A1 * | 11/2015 | Marks | G01J 5/0025 383/103 |
| 2016/0048973 A1 | 2/2016 | Takenaka | |
| 2016/0048992 A1 | 2/2016 | Irie | |
| 2016/0050369 A1 | 2/2016 | Takenaka | |
| 2016/0119541 A1 | 4/2016 | Alvarado-Moya | |
| 2016/0205341 A1 * | 7/2016 | Hollander | G06T 7/20 375/240.08 |
| 2016/0234438 A1 | 8/2016 | Satoh | |
| 2016/0239340 A1 | 8/2016 | Chauvet | |
| 2016/0274338 A1 | 9/2016 | Davies | |
| 2016/0307372 A1 | 10/2016 | Pitts | |
| 2016/0366326 A1 * | 12/2016 | Sen | H04N 5/2353 |
| 2016/0379373 A1 * | 12/2016 | Givon | G06T 7/20 382/103 |
| 2017/0038942 A1 | 2/2017 | Rosenfeld | |
| 2017/0046820 A1 | 2/2017 | Steel | |
| 2017/0075356 A1 | 3/2017 | Delp | |
| 2017/0180640 A1 | 6/2017 | Salivar | |

OTHER PUBLICATIONS

Allene C, et al,, 'Seamless Image-based Texture Atlases Using Multi-band Blending,' Pattern Recognition, 2008. ICPR 2008. 19th International Conference on, 2008. 4 pages.

Badrinarayanan V., et al., 'Segnet: a Deep Convoiutional Encoder-Decoder Architecture for Image Segmentation,' arXiv preprint arXiv: 1511.00561, 2015. 14 pages.

Barghout L. and Sheynin J., 'Real-world scene perception and perceptual organization: Lessons from Computer Vision'. Journal of Vision, 2013, vol. 13 (9). (Abstract). 1 page.

Barghout L., 'Visual Taxometric approach Image Segmentation using Fuzzy-Spatial Taxon Cut Yields Contextually Relevant Regions,' Communications in Computer and Information Science (CCIS), Springer-Verlag, 2014, pp. 163-173.

Bay H., et a!., 'Surf: Speeded up Robust Features,' European Conference on Computer Vision, Springer Berlin Heidelberg, 2006, pp. 404-417.

Beier et al., 'Feature-Based Image Metamorphosis,' in Computer Graphics Journal, Jul. 1992, vol. 28 (2), pp. 35-42.

Brainard R.C., et al., "Low-Resolution TV: Subjective Effects of Frame Repetition and Picture Replenishment," Bell Labs Technical Journal, Jan. 1967, vol. 46 (1), pp. 261-271.

Burt et al., 'A Multiresolution Spline with Application to Image Mosaics,' in ACM Transactions on Graphics (TOG), 1983, vol. 2, No. 4, pp. 217-236.

Chan et al., 'Active contours without edges'. IEEE Transactions on Image Processing, 2001, 10 (2), pp. 266-277 (hereinafter 'Chan').

Chang H., etal., 'Super-resolution Through Neighbor Embedding,' Computer Vision and Pattern Recognition, 2004. CVPR2004. Proceedings of the 2004 IEEE Computer Society Conference on, vol. 1, 2004. 8 pages.

Elen, 'Whatever happened to Ambisonics' AudioMedia Magazine, Nov. 1991. 18 pages.

Gracias, et al., 'Fast Image Blending Using Watersheds and Graph Cuts,' Image and Vision Computing, 2009, vol. 27 (5), pp. 597-607.

Herbst E., et al., 'Occlusion Reasoning for Temporal Interpolation Using Optical Flow,' Department of Computer Science and Engineering, University of Washington, Tech. Rep. UW-CSE-09-08-01,2009. 41 pages.

Jakubowski M., et aL, 'Block-based motion estimation algorithmsa survey,' Opto-Eiectronics Review 21, No. 1 (2013), pp. 88-102.

Kendall A., et al., 'Bayesian Segnet: Model Uncertainty in Deep Convolutional Encoder-Decoder Architectures for Scene Understanding,' arXiv: 1511.02680, 2015.

Lowe D.G., 'Object Recognition From Local Scale-invariant Features,' Computer vision, The proceedings of the seventh IEEE international conference on 1999, vol. 2, pp. 1150-1157.

Mitzel D., et al., 'Video Super Resolution Using Duality Based TV-I1 Optical Flow,' Joint Pattern Recognition Symposium, 2009, pp. 432-441.

Perez et al., 'Poisson Image Editing,' in ACM Transactions on Graphics (TOG), 2003, vol. 22, No. 3, pp. 313-318.

Schick A., et al., "Improving Foreground Segmentations with Probabilistic Superpixel Markov Random Fields," 2012 IEEE Computer Society Conference on Computer Vision and Pattern Recognition Workshops, 2012, pp. 27-31.

Schwartz, E., et al., "Implementation of Compression with Reversible Embedded Wavelets," In Proc. SPIE, 1995, 12 pages.

Suzuki et al., 'Inter Frame Coding with Template Matching Averaging,' in IEEE international Conference on Image Processing Proceedings (2007), vol. (iII), pp. 409-412.

Szeliski R., "Computer Vision: Algorithms and Applications," Springer Science & Business Media, 2010, 979 pages.

Szeliski R., "Image Alignment and Stitching: A Tutorial," Foundations and Trends in Computer Graphics and Vision, 2006, vol. 2 (1), pp. 1-59.

Thaipanich T., et al., "Low Complexity Algorithms for Robust Video frame rate up-conversion (FRUC) technique," IEEE Transactions on Consumer Electronics, Feb. 2009, vol. 55 (1),pp. 220-228.

Vass, J., et al., 'Efficient Three-Dimensional Wavelet Codecs for Networked Video Communication,' in Proceedings of IEEE International Conference on Image Processing, Kobe, Japan, Oct. 1999, pp. 565-569.

Xiao, et al., 'Multiple View Semantic Segmentation for Street View Images,' 2009 IEEE 12th International Conference on Computer Vision, 2009, pp. 686-693.

Xiong Y et ai 'Gradient Domain Image Blending and Implementation on Mobile Devices,' International Conference on Mobile Computing, Applications, and Services, Springer Berlin Heidelberg, 2009, pp. 293-306.

Zhai et al., "A Low Complexity Motion Compensated Frame Interpolation Method," in IEEE International Symposium on Circuits and Systems (2005), pp. 4927-4930.

Zhang., "A Flexible New Technique for Camera Calibration" IEEE Transactions, dated Nov. 2000, vol. 22, No. 11, pp. 1330-1334.

(56) References Cited

OTHER PUBLICATIONS

Besl, P., et al., "Method for registration of 3-d shapes," In Robotics-DL tentative, International Society for Optics and Photonics, 1992, pp. 586-606.
Grundmann, M., et al., "Auto-directed video stabilization with robust L1 optimal camera paths," In Computer Vision and Pattern Recognition (CVPR), 2011 IEEE Conference on, pp. 225-232.
Hartley, R., et al., "Multiple view geometry in computer vision," Cambridge university press, 2003, with Cover Page and Table of Contents, 9 Pages.
Nister, D., "An efficient solution to the five-point relative pose problem," IEEE Transactions on Pattern Analysis and Machine Intelligence, 2004, pp. 756-770, vol. 26, Issue 6.
Shi, J., et al., "Good features to track," In Computer Vision and Pattern Recognition, 1994. Proceedings CVPR '94., 1994 IEEE Computer Society Conference on, pp. 593-600.
Tomasi, C, et al., "Detection and tracking of point features," School of Copmuter Science, Carnegie Mellon Univ. Pittsburgh, 1991, 38 Pages.

\* cited by examiner

IMAGE ALIGNMENT USING A VIRTUAL GYROSCOPE MODEL

PRIORITY

This application is a continuation of, and claims the benefit of priority to, co-owned and co-pending U.S. patent application Ser. No. 15/249,347 filed Aug. 26, 2016 of the same title, which in turn claims the benefit of priority to U.S. Provisional Application Ser. No. 62/352,530 filed on Jun. 20, 2016 of the same title, each of the foregoing being incorporated herein by reference in their entireties.

BACKGROUND

Technical Field

This disclosure relates to video or image processing, and more specifically, to automatically compensating for camera motion in a sequence of images.

Description of the Related Art

Professional videographers often use gyroscope-based cameras or camera mounts to reduce or eliminate unwanted camera motion when capturing video or burst images. However, gyroscope-based cameras or camera mounts can be bulky and expensive and thus may be unsuitable for consumer-grade action cameras where low cost and small form factor are highly desirable. Electronic image stabilization (EIS) may be used to digitally compensate for camera motion in post-processing. However, conventional EIS may introduce undesirable artifacts into the video or burst images, particularly when non-rectilinear lens distortion is introduced by the camera.

SUMMARY

The present disclosure satisfies the foregoing needs by providing, inter alia, methods and apparatus for aligning a target image to a reference image in the presence of lens distortion.

In a first aspect of the present disclosure, a method for aligning a target image to a reference image in the presence of lens distortion is disclosed. In one embodiment, the method includes: receiving the target image and the reference image, each of the target image and the reference image being captured by a lens having lens distortion parameters; detecting a first plurality of visual features appearing in the target image at first image feature coordinates in a two-dimensional image space, and a corresponding second plurality of visual features appearing in the reference image at second image feature coordinates in the two-dimensional image space; transforming, based on the lens distortion parameters, the first and second image feature coordinates from the two-dimensional image space to a three-dimensional spherical space to generate respective first spherical feature coordinates and second spherical feature coordinates; applying, by a processor, a rotation to the target image in the three-dimensional spherical space to generate a rotated target image, the applying of the rotation comprising (i) aligning at least a subset of the first spherical feature coordinates to a corresponding subset of the second spherical feature coordinates, and (ii) determining the subset of the first spherical feature coordinates and the subset of the second spherical feature coordinates as background features in the target image and the reference image, respectively; and inverse transforming, based on the lens distortion parameters, the rotated target image to the two-dimensional image space. The determining of the subset of the first spherical feature coordinates and the subset of the second spherical feature coordinates as background features includes: determining feature tracks representing a distance along a spherical arc and a direction from each of the first spherical feature coordinates to a corresponding one of the second spherical feature coordinates; clustering the feature tracks by length to determine a plurality of feature track clusters; and determining from the plurality of feature track clusters, a background cluster of feature tracks corresponding to the background features.

In one variant, the determining of the background cluster includes: determining a predefined number of largest clusters from the plurality of feature track clusters; determining weighted averages of track lengths in each of the largest clusters; and selecting a cluster having a shortest weighted average of the weighted averages.

In another variant, the applying of the rotation further includes: determining first three-dimensional Cartesian coordinates corresponding to the subset of the first spherical feature coordinates and second three-dimensional Cartesian coordinates corresponding to the subset of the second spherical feature coordinates; determining a first coordinate centroid of the first three-dimensional Cartesian coordinates and a second coordinate centroid of the second three-dimensional Cartesian coordinates; determining first translated coordinates as a difference between the first three-dimensional Cartesian coordinates and the first coordinate centroid, and second translated coordinates as a difference between the second three-dimensional Cartesian coordinates and the second coordinate centroid; determining products between each of the first translated coordinates and respective corresponding second translated coordinates; determining an accumulation matrix as a combination of the vector products; and applying a singular value decomposition to the accumulation matrix to determine a rotation matrix, the rotation matrix indicating the rotation to apply to the target image in the three-dimensional spherical space.

In yet another variant, the lens distortion parameters correspond to a fisheye lens that introduces curvature into straight lines in a scene near edges of a captured image.

In yet another variant, the applying of the rotation further comprises optimally aligning the subset of the first spherical feature coordinates to the corresponding subset of the second spherical feature coordinates based on an optimization metric.

In yet another variant, the method further includes storing the lens distortion parameters within the target image and the reference image.

In yet another variant, the method further includes determining from the plurality of feature track clusters a foreground object that is distinct from the background features.

In a second aspect of the present disclosure, a non-transitory computer-readable apparatus is disclosed. In one embodiment, the computer-readable apparatus includes a storage medium storing a computer program configured to align a target image to a reference image in the presence of lens distortion, the computer program including instructions configured to, when executed by a processor apparatus, cause the processor apparatus to perform steps including: receiving the target image and the reference image, each of the target image and the reference image being captured by a lens having lens distortion parameters; detecting a first plurality of visual features appearing in the target image at first image feature coordinates in a two-dimensional image space, and a corresponding second plurality of visual features appearing in the reference image at second image feature coordinates in the two-dimensional image space; transforming, based on the lens distortion parameters, the first and second image feature coordinates from the two-dimensional image space to a three-dimensional spherical space to generate respective first spherical feature coordinates and second spherical feature coordinates; applying a rotation to the target image in the three-dimensional spherical space to generate a rotated target image, the application of the rotation comprises aligning at least a subset of the first spherical feature coordinates to a corresponding subset of the second spherical feature coordinates, and determining the subset of the first spherical feature coordinates and the subset of the second spherical feature coordinates as background features in the target image and the reference image, respectively; and inverse transforming, based on the lens distortion parameters, the rotated target image to the two-dimensional image space. The determination of the subset of the first spherical feature coordinates and the subset of the second spherical feature coordinates as background features includes: determining feature tracks representing a distance along a spherical arc and a direction from each of the first spherical feature coordinates to a corresponding one of the second spherical feature coordinates; clustering the feature tracks by length to determine a plurality of feature track clusters; and determining from the plurality of feature track clusters, a background cluster of feature tracks corresponding to the background features.

In one variant, the determination of the background cluster includes: determining a predefined number of largest clusters from the plurality of feature track clusters; determining weighted averages of track lengths in each of the largest clusters; and selecting a cluster having a shortest weighted average of the weighted averages.

In another variant, the application of the rotation further includes: determining first three-dimensional Cartesian coordinates corresponding to the subset of the first spherical feature coordinates and second three-dimensional Cartesian coordinates corresponding to the subset of the second spherical feature coordinates; determining a first coordinate centroid of the first three-dimensional Cartesian coordinates and a second coordinate centroid of the second three-dimensional Cartesian coordinates; determining first translated coordinates as a difference between the first three-dimensional Cartesian coordinates and the first coordinate centroid, and second translated coordinates as a difference between the second three-dimensional Cartesian coordinates and the second coordinate centroid; determining products between each of the first translated coordinates and respective corresponding second translated coordinates; determining an accumulation matrix as a combination of the vector products; applying a singular value decomposition to the accumulation matrix to determine a rotation matrix, the rotation matrix indicating the rotation to apply to the target image in the three-dimensional spherical space.

In yet another variant, the lens distortion parameters correspond to a fisheye lens that introduces curvature into straight lines in a scene near edges of a captured image.

In yet another variant, the application of the rotation includes optimally aligning the subset of the first spherical feature coordinates to the corresponding subset of the second spherical feature coordinates based on an optimization metric.

In yet another variant, the determination of the background cluster includes determining which of the plurality of feature track clusters comprises a cluster having the largest size.

In yet another variant, the instructions are configured to, when executed by the processor apparatus, further apply a translation to the target image in the three-dimensional spherical space to generate the rotated target image.

In a third aspect of the present disclosure, a video server is disclosed. In one embodiment, the video server includes one or more processors; and a non-transitory computer-readable apparatus having a storage medium configured to store a computer program having instructions for aligning a target image to a reference image in the presence of lens distortion, the instructions, when executed by one or more processor apparatus, being configured to cause the one or more processor apparatus to perform steps including: receiving the target image and the reference image, each of the target image and the reference image captured by a lens having lens distortion parameters; detecting a first plurality of visual features appearing in the target image at first image feature coordinates in a two-dimensional image space, and a corresponding second plurality of visual features appearing in the reference image at second image feature coordinates in the two-dimensional image space; transforming, based on the lens distortion parameters, the first and second image feature coordinates from the two-dimensional image space to a three-dimensional spherical space to generate respective first spherical feature coordinates and second spherical feature coordinates; applying a rotation to the target image in the three-dimensional spherical space to generate a rotated target image, the application of the rotation being configured to align at least a subset of the first spherical feature coordinates to a corresponding subset of the second spherical feature coordinates; and inverse transforming, based on the lens distortion parameters, the rotated target image to the two-dimensional image space. The application of the rotation includes determination of the subset of the first spherical feature coordinates and the subset of the second spherical feature coordinates as background features in the target image and the reference image, respectively. The determination of the subset of the first spherical feature coordinates and the subset of the second spherical feature coordinates as background features includes: determination of feature tracks representing a distance along a spherical arc and direction from each of the first spherical feature coordinates to a corresponding one of the second spherical feature coordinates; clustering of the feature tracks by length to determine a plurality of feature track clusters; determination of from the plurality of feature track clusters, a background cluster of feature tracks corresponding to the background features.

In one variant, the determination of the background cluster includes: determination of a predefined number of largest clusters from the plurality of feature track clusters; determination of weighted averages of track lengths in each of the largest clusters; and selection of a cluster having a shortest weighted average of the weighted averages.

In another variant, the application of the rotation further includes: determining first three-dimensional Cartesian coordinates corresponding to the subset of the first spherical feature coordinates and second three-dimensional Cartesian coordinates corresponding to the subset of the second spherical feature coordinates; determining a first coordinate centroid of the first three-dimensional Cartesian coordinates and a second coordinate centroid of the second three-dimensional Cartesian coordinates; determining first translated coordinates as a difference between the first three-dimensional Cartesian coordinates and the first coordinate centroid and second translated coordinates as a difference between the second three-dimensional Cartesian coordinates and the second coordinate centroid; determining products between each of the first translated coordinates and respective corresponding second translated coordinates; determining an accumulation matrix as a combination of the vector products; and applying a singular value decomposition to the accumulation matrix to determine a rotation matrix, the rotation matrix being configured to indicate the rotation to apply to the target image in the three-dimensional spherical space.

In yet another variant, the application of the rotation further includes an alignment of the subset of the first spherical feature coordinates to the corresponding subset of the second spherical feature coordinates based on an optimization metric.

In yet another variant, the video server is configured to be in data communication with one or more of a camera device and a client device via a network.

In yet another variant, the instructions are further configured to, when executed by the one or more processors, cause the one or more processors to extract the lens distortion parameters from one or more of the target image and the reference image.

Other features and advantages of the present disclosure will be immediately recognized by persons of ordinary skill in the art with reference to the attached drawings and detailed description of exemplary embodiments as given below.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

In an embodiment, images captured from a fisheye lens or other lens with known distortion parameters may be transformed into a spherical image space using the known lens distortion parameters. Features in a target image may be detected and matched to features in a reference image. In the spherical image space, images may be re-pointed or rotated in three dimensions to align all or a subset of the features of the target image to the corresponding features of the reference image. For example, in a sequence of images, background features of the target image in the spherical image space may be aligned to background features of the reference image in the spherical image space to compensate for camera motion while preserving foreground motion. After alignment, the inverse transformation may then be applied to bring the images back into the original (e.g., fisheye or other known distortion) image space. The described technique for aligning image features may be useful for a number of applications such as electronic image stabilization applications, foreground/background segmentation and generating composite images or video.

Embodiments may also include a video server and a non-transitory computer-readable storage medium to enable a processor to perform the above-described method.

Media Processing System

Figure 1:
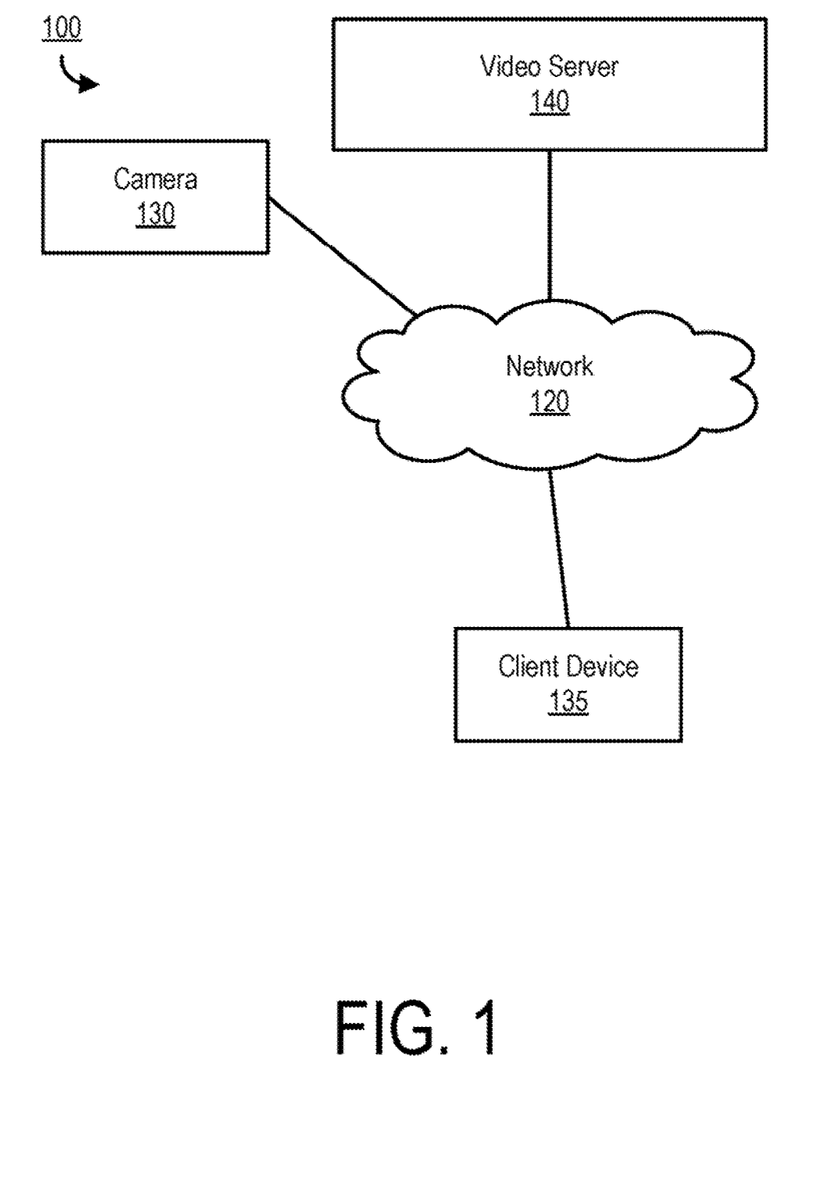
FIG. 1 illustrates an example embodiment of a media processing system.

FIG. 1 is a block diagram of a media content system 100, according to one embodiment. The media content system 100 may include a network 120, a camera 130, a client device 135 and a video server 140. In alternative configurations, different and/or additional components may be included in the media content system 100.

The camera 130 can include a camera body, one or more a camera lenses, various indicators on the camera body (such as LEDs, displays, and the like), various input mechanisms (such as buttons, switches, and touch-screen mechanisms), and electronics (e.g., imaging electronics, power electronics, metadata sensors, etc.) internal to the camera body for capturing images via the one or more lenses and/or performing other functions. In one embodiment, the camera 130 may capture images using a wide-angle lens that introduces some lens distortion into the image, such as, for example, a fisheye effect. In this example, the projection of the captured images onto a rectangular display may result in the appearance of increased distortion (e.g., curvature) in the edge and corner regions of the images relative to the center region. For example, straight lines in the scene that are centered in the image may appear relatively straight, but straight lines in the scene may appear increasingly curved near the edge and corner regions of the image as the distance from the center increases. Furthermore, in a fisheye lens, objects of equal size in the scene may appear larger in the center region and may appear increasingly smaller as they approach the edges. In one embodiment, the camera 130 may capture spherical or substantially spherical content via two or more wide-angle lenses (e.g., two hyper-hemispherical lenses pointed in opposite directions). In other embodiments, the camera 130 may capture images or video having another non-rectilinear field of view in which some curvature is introduced into the images as an artifact of the lens parameters.

The video server 140 may receive and store videos and/or images captured by the camera 130. Furthermore, in one embodiment, the video server 140 may provide the user with an interface, such as a web page or native application installed on the client device 135, to interact with and/or edit the stored videos. The videos stored by the video server 140 may include traditional videos having, for example, 30 frames per second or 60 frames per second, or videos formed from a sequence of burst-captured images or time-lapsed images.

In a burst mode, for example, the camera 130 may capture a given number of frames (burst of photos) over a given time window, typically in rapid succession. In some implementations, the number of photos per burst may be configured by the user, e.g., between 1 and 1000. In some implementations, the time window duration may be user selected (e.g., between 0.1 s and 10 s) or dynamically configured by the camera given user preferences (e.g., inter-shot duration), detected user activity (e.g., sky diving, surfing, biking), available storage, image resolution, bracketing configuration (e.g., 3 exposures per shot), and/or other settings. By way of an illustration, a skateboarder, attempting to record a jump, may configure the camera to collect a burst of 30 frames within 1 s time window.

When operating in a time lapse mode, the camera 130 may be configured to capture one or more images at a given interval. The capture may commence based on an indication by the user (e.g., press of the record button, voice command, camera shake, clap, and/or other indication). In some implementations, the time lapse image acquisition may be initiated automatically by the camera based on a given condition (e.g., timer expiration, parameter breaching a threshold (e.g., ambient light reaching a given level during pre-dawn/dawn), arrival of a wireless communication (e.g., text message, ping), and/or other condition). The time lapse photo acquisition interval may be configured, for example, between 0.1 s and 120 s. In some implementations of time lapse photo acquisition, the camera 130 may be configured to take a single image (photo) at the specified interval or a plurality of images (e.g., 2-100). Multiple images may be utilized, e.g., when bracketing for exposure and/or focus distance. Duration of the time lapse may be configured by the user.

A user can interact with interfaces provided by the video server 140 via the client device 235 in order to edit or view the videos and images. The client device 135 may be any computing device capable of receiving user inputs and viewing video content. Furthermore, the client device 135 may be capable of transmitting and/or receiving data via the network 120. In one embodiment, the client device 135 may be a conventional computer system, such as a desktop or a laptop computer. Alternatively, the client device 135 may be a device having computer functionality, such as a personal digital assistant (PDA), a mobile telephone, a smartphone or another suitable device. The user can use the client device 135 to view and interact with or edit videos stored on the video server 140. For example, the user can view web pages including video summaries for a set of videos captured by the camera 130 via a web browser on the client device 135. Alternatively, the editing and viewing interfaces described herein may execute locally on the client device 135 without necessarily requiring the video server 140.

One or more input devices associated with the client device 135 receive input from the user. For example, the client device 135 can include a touch-sensitive display, a keyboard, a trackpad, a mouse, a voice recognition system, and the like. In some embodiments, the client device 135 can access video directly from the camera 130, and can transfer the accessed video to the video server 140 or view the video locally on the client device 135. While FIG. 1 shows a single client device 135, in various embodiments, any number of client devices 135 may communicate with the video server 140.

The network 120 enables communication between the video server 140, the client device 135, and the camera 130. The network 120 may include any combination of local area and/or wide area networks, using both wired and/or wireless communication systems. In one embodiment, the network 120 uses standard communications technologies and/or protocols.

Various components of the environment 100 of FIG. 1 such as the camera 130, video server 140, and client device 125 can include one or more processors and a non-transitory computer-readable storage medium storing instructions therein that when executed cause the processor to carry out the functions attributed to the respective devices described herein. Furthermore, the processes described herein may be performed in the camera 130, on the video server 140, or on the client device 125.

Figure 2:
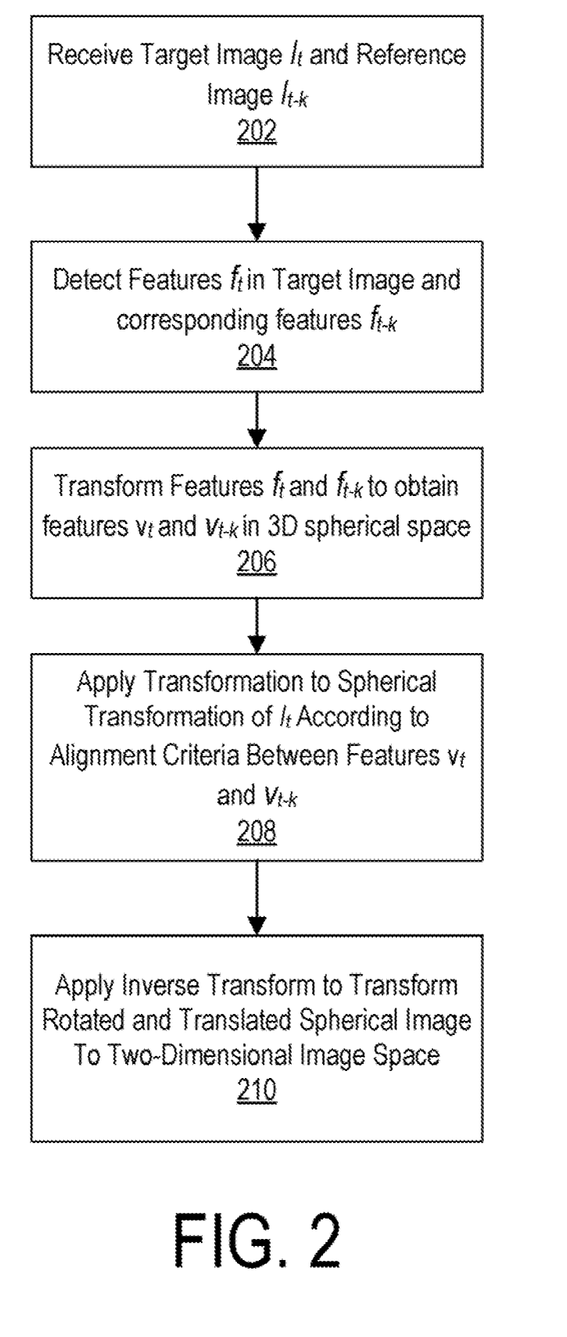
FIG. 2 illustrates an embodiment of a process for aligning a target image to a reference image.

FIG. 2 illustrates an embodiment of a process for aligning features of a target image to features of a reference image. The process of the FIG. 2 may use a virtual gyroscope model in which the rate of rotation of the camera about the three (X, Y, Z) coordinate axes are estimated based on visual features in a sequence of images (instead of using hardware-based sensors typically found in a traditional hardware gyroscope). By determining the gyroscope data of the camera at a particular time, tasks such as image alignment, video stabilization, and background segmentation may be enabled.

In the process of FIG. 2, a target image $I_t$ and a reference image $I_{t-k}$ may be received 202 from a sequence of N images, where k<N. In an embodiment, the images may have non-rectilinear lens distortion (such as a fisheye lens distortion or other lens distortion). Furthermore, camera motion may occur between capturing the images $I_t$ and $I_{t-k}$ such that stationary objects in the scene may be misaligned between images $I_t$ and $I_{t-k}$. A plurality of features $f_t$ in the two-dimensional image space (x, y) appearing in the target image $I_t$ and corresponding features $f_{t-k}$ in the two-dimensional image space (x, y) appearing in the reference image $I_{t-k}$ are detected 204. The features may comprise, for example, a vector including the (x, y) coordinate locations of the feature in the image, the feature's scale, a descriptor of the feature (e.g., a vector that may be unique and robust to the specific feature), an angle of the feature, or other parameters. The specific composition of the feature vector may vary depending on the type of feature being used. Any number of feature detection and tracking algorithms can be employed here, including, for example, the Kanade-Lucas-Tomasi (KLT) feature tracker. The feature detection and tracking algorithm may track features based on only the target image $I_t$ and the reference $I_{t-k}$, or may also track based on prior, intermediate, or subsequent images in an image sequence. Because in a video or burst sequence of images, the camera motion between pairs of images may change very little, the KLT feature tracker may be suitable due its speed and performance. In other embodiment, more robust algorithms such as Scale-Invariant Feature Transform (SIFT) or Speeded Up Robust Features (SURF) may be used for feature detection and tracking.

Figure 6:
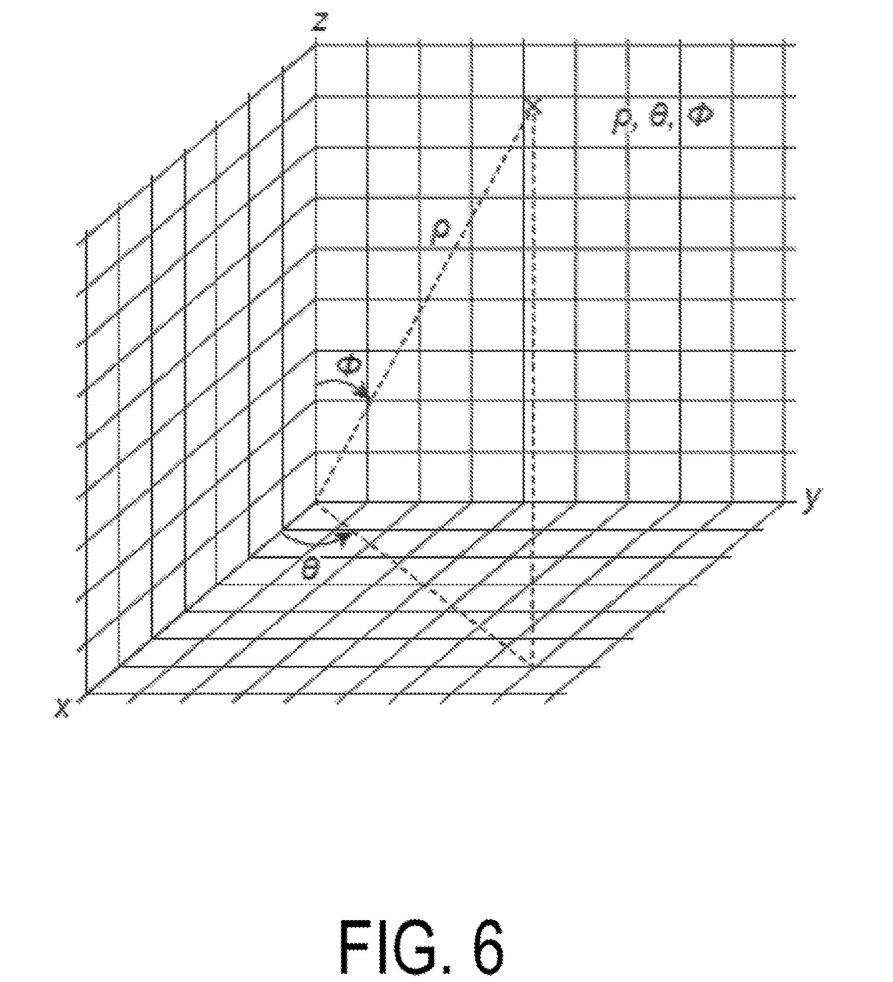
FIG. 6 illustrates an example embodiment of a spherical coordinate system.

The two-dimensional image space feature coordinates (x, y) in $f_t$ and $f_{t-k}$ may be transformed 206 into three-dimensional spherical coordinates $v_t$ and $v_{t-k}$, respectively, where the $i^{th}$ spherical coordinate corresponding to the $i^{th}$ feature is $v_i=[\rho_i, \theta_i, \phi_i]$ and $\rho$ is on the unit sphere, $\theta$ is the azimuthal angle, and $\phi$ is the elevation angle measured from the +Z-axis. An example illustration of this coordinate system is shown in FIG. 6.

The transformation from the two-dimensional image space to the three-dimensional spherical space may be performed using the lens distortion model that maps the two-dimensional image coordinates to the three-dimensional spherical coordinates. In one embodiment, the lens distortion model may comprise a predefined mapping stored by the video server 140. In another embodiment, the lens distortion model or a reference to it may be stored as metadata in the captured images or video, and extracted by the video server 140 when processing the image or video. In another embodiment, the lens distortion model may be calculated based on visual characteristics of the images.

A transformation 208 may be applied to the spherical transformation of the target image $I_t$ in order to align the features of the target image $v_t$ to the features of the reference image $v_{t-k}$. For example, the transformation may comprise a rotation and a translation that optimizes alignment criteria (e.g., a sum of absolute differences optimization, a mean of absolute differences optimization, a sum of ratios optimization, or other optimization metric in L1 norm, a least squares optimization, a mean squared error optimization, a maximum likelihood estimate optimization, or other optimization metric in L2 norm). A more detailed example of a process for aligning the features of the target image $v_t$ to the features of the reference image $v_{t-k}$ is described with respect to FIG. 3 below. An inverse transform may then be applied 210 to the transformed target image to transform it back to the two-dimensional image space. The inverse transform may also be based on the lens distortion model and may comprise a predefined mapping of the three-dimensional spherical coordinates to the two-dimensional image coordinates.

Although the process of FIG. 2 describes three explicit transforms in steps 206, 208, 210, the transforms may be combined into a single transform to improve processing efficiency.

Figure 3:
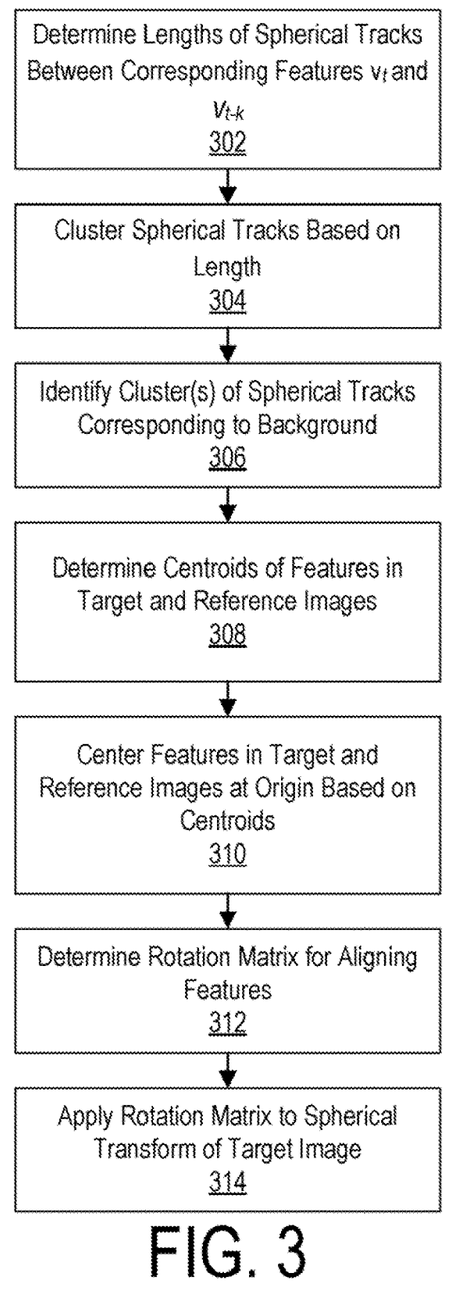
FIG. 3 illustrates an embodiment of a process for applying a rotation and translation to a target image.

FIG. 3 illustrates an example process for aligning the features of the target image $v_t$ to the features of the reference image $v_{t-k}$. In this example process, lengths of spherical tracks between corresponding features in $v_t$ and $v_{t-k}$ may be determined 302. In an embodiment, the spherical track may comprise an arc representing the shortest distance between $v_t$ and $v_{t-k}$ on the surface of a sphere. The lengths of the spherical tracks may be defined as $d=\rho \cdot \arccos(\sin \phi_1 \cdot \sin \phi_2 + \cos \phi_1 \cdot \cos \phi_2 \cdot \cos(\Delta\theta))$, where $\phi_1, \theta_1$ and $\phi_2, \theta_2$ are as defined in $v_i$ above, $\Delta\theta$ is the absolute difference of $\theta_1$ and $\theta_2$, and $\rho$ is the radius of the sphere (which may be $\rho=1$ in the spherical coordinate system defined above).

The lengths of the spherical tracks may be clustered 304. In general, features corresponding to stationary background objects in the images should have feature tracks may be expected to have similar feature track lengths related to the amount of camera motion. Furthermore, features corresponding to moving foreground objects may be expected to have similar feature track lengths related to both the amount of camera motion and the motion of the object. Features tracks that have lengths not sufficiently similar to other feature tracks may correspond to features that are incorrectly tracked and do not correspond to the same object. Thus, in one embodiment, feature tracks may be clustered to include a cluster of feature tracks corresponding to the background, one or more clusters of features tracks each corresponding to a different foreground object, and a set of outlier feature tracks corresponding to incorrectly tracked features. In one embodiment, the feature tracks corresponding to the background are identified 306. In an embodiment, one or more metrics may be used to determine which cluster (or clusters) corresponds to the background. For example, one embodiment, the largest cluster may be determined to correspond to the background. In another embodiment, the cluster corresponding the feature tracks with shortest lengths may be determined to correspond to the background. In yet another embodiment, a predefined number (e.g., 3) of largest clusters may be chosen and a weighted average of the track lengths may be computed. Then, the cluster with the shorted weighted average track length may be determined to correspond to the background. The feature space for clustering can vary widely from simple differences between all features to more complex clustering in higher dimensions. This can vary depending on the application as one type of clustering may be better for different applications.

A desired rotation may then be determined to rotate the target image such that the features are aligned to the features of the reference image. For example, in one embodiment, a rotation is determined that optimally aligns the features in the three-dimensional spherical space according to an optimization criteria (e.g., a sum of absolute differences optimization, a mean of absolute differences optimization, a sum of ratios optimization, or other optimization metric in L1 norm, a least squares optimization, a mean squared error optimization, a maximum likelihood estimate optimization, or other optimization metric in L2 norm). In one embodiment, the alignment may be determined by solving for a rotation matrix R and a translation t in the equation:

$$B=RA+t$$

where A represents the Cartesian coordinate transform $c_t=[x_t, y_t, z_t]^T$ of the spherical coordinates $v'_t$ of the background features and B represents the Cartesian coordinate transform $c_{t-k}=[x_{t-k}, y_{t-k}, z_{t-k}]^T$ of the spherical coordinates $v'_{t-k}$ of the background features.

To solve for the optimal rotation, the centroids $\mu_A$ and $\mu_B$ may first be determined 308 for both feature datasets A and B corresponding to the target image and reference image respectively. Both datasets may then be centered 310 so that the centroids are at the origins. This removes the translational component, leaving only the rotational component. The rotation matrix R may then be determined 312 for rotating the feature dataset A of the target image to align to the feature dataset B of the reference image. For example, in one embodiment, accumulation matrix may then be created for all M points and the singular value decomposition (SVD) may be used to solve the rotation matrix R. These steps are summarized in the below equations:

$$S = \sum_{i=1}^{M}(c_A^i - \mu_A)(c_B^i - \mu_B)^T$$

$$[U, D, V] = SVD(S)$$

$$R = UV^T$$

The rotation matrix R may be decomposed to find the rotation angles ($\alpha, \beta, \gamma$) about the X, Y, and Z axes, respectively. These rotation angles may then be applied 314 to repoint the target image $I_t$ in spherical space.

The algorithm described above can compensate for camera motion that is purely rotational. Furthermore, the algorithm may be robust enough to handle at least small amounts of camera translation in the three-dimensional space. For large camera translations, a full three-dimensional visual odometry system may be used to detect and compute accurate camera rotations and translations.

EXAMPLE APPLICATIONS

Image Registration

Figure 4A:
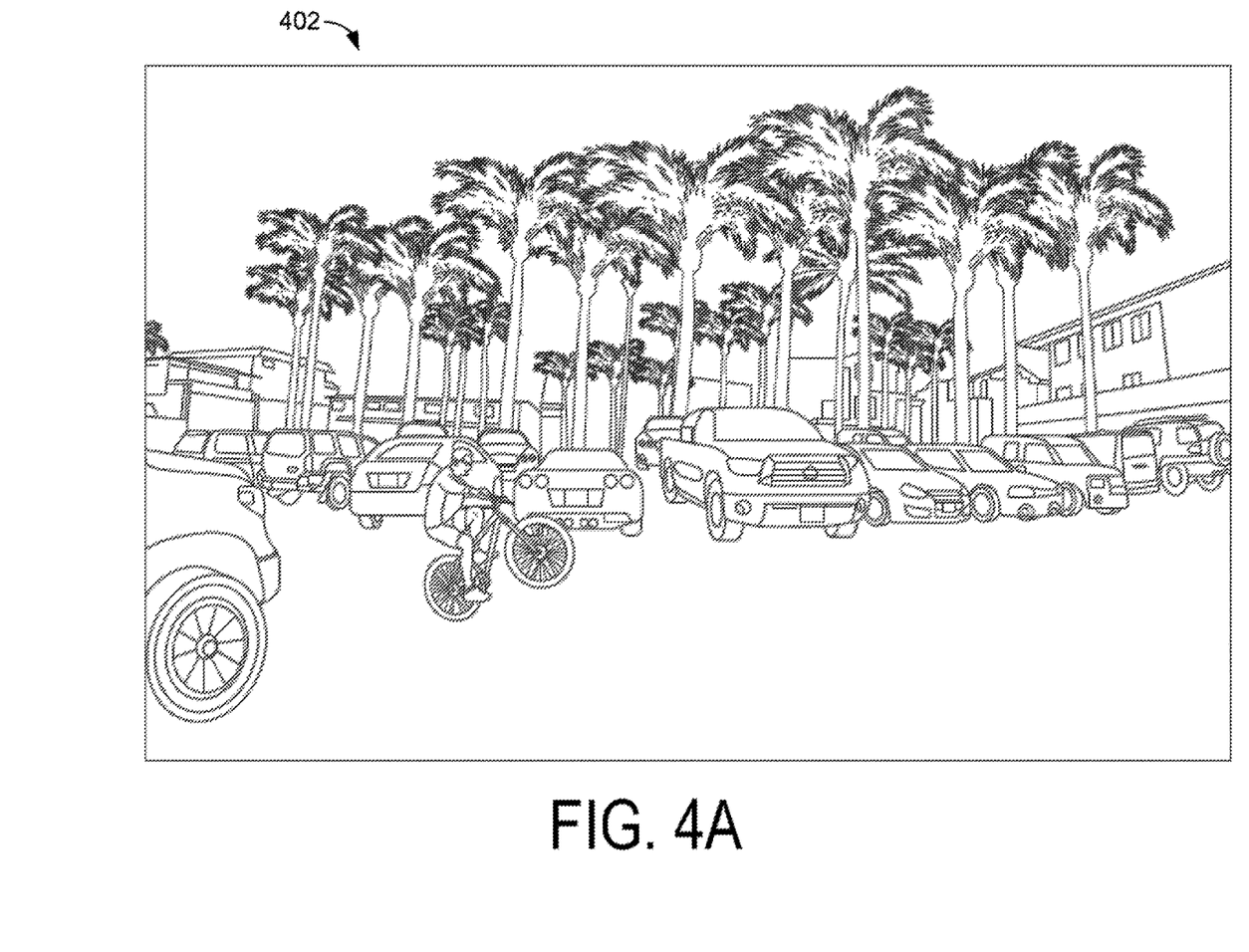
FIG. 4A illustrates an example embodiment of a reference image.
Figure 4B:
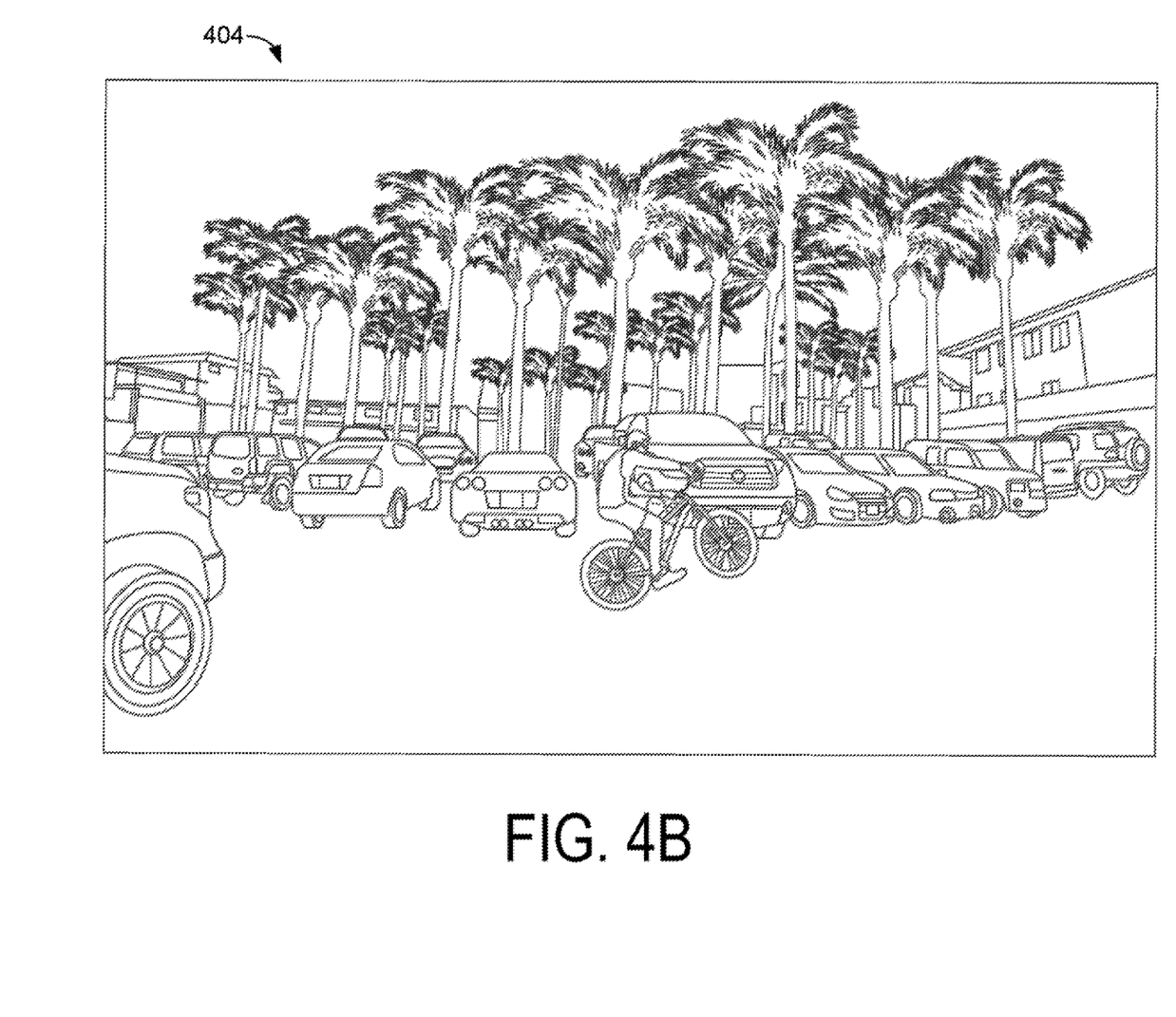
FIG. 4B illustrates an example embodiment of a target image.
Figure 4C:
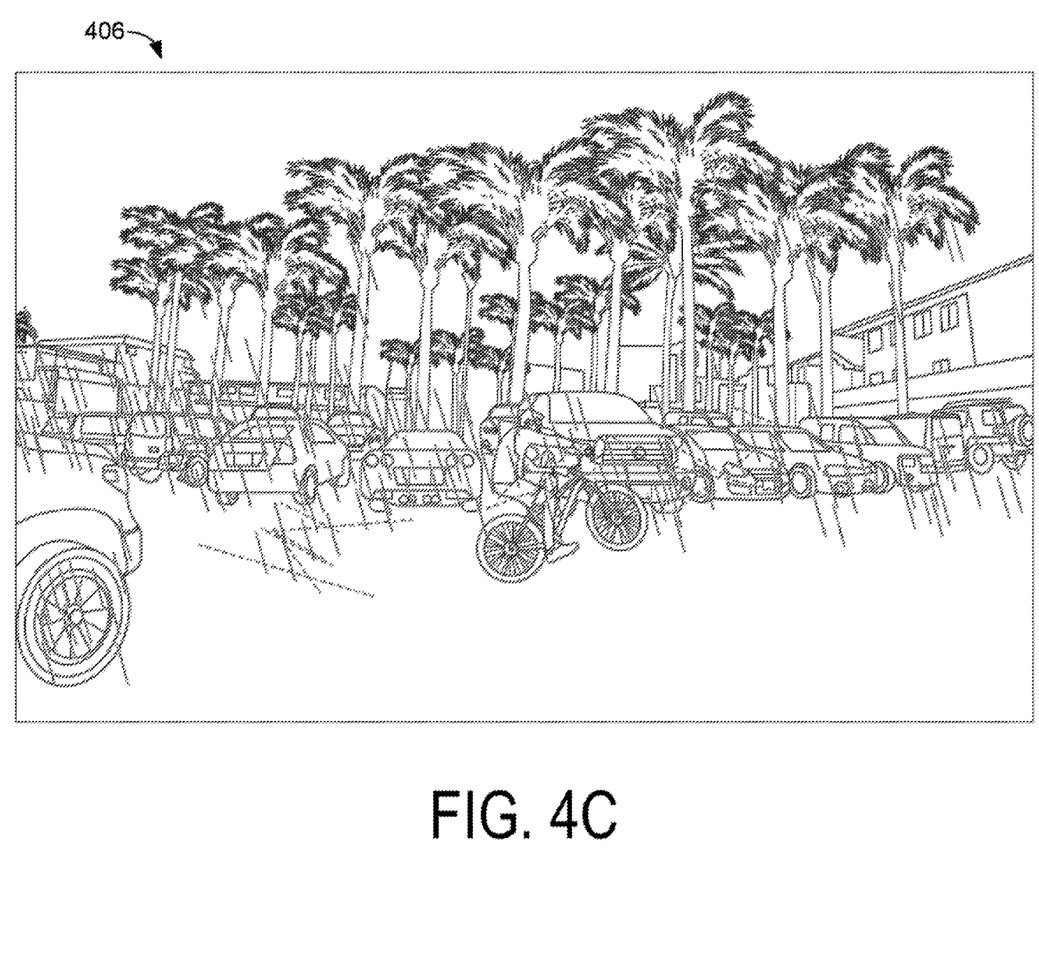
FIG. 4C illustrates an example embodiment of feature tracks between a reference image and the target image.
Figure 4D:
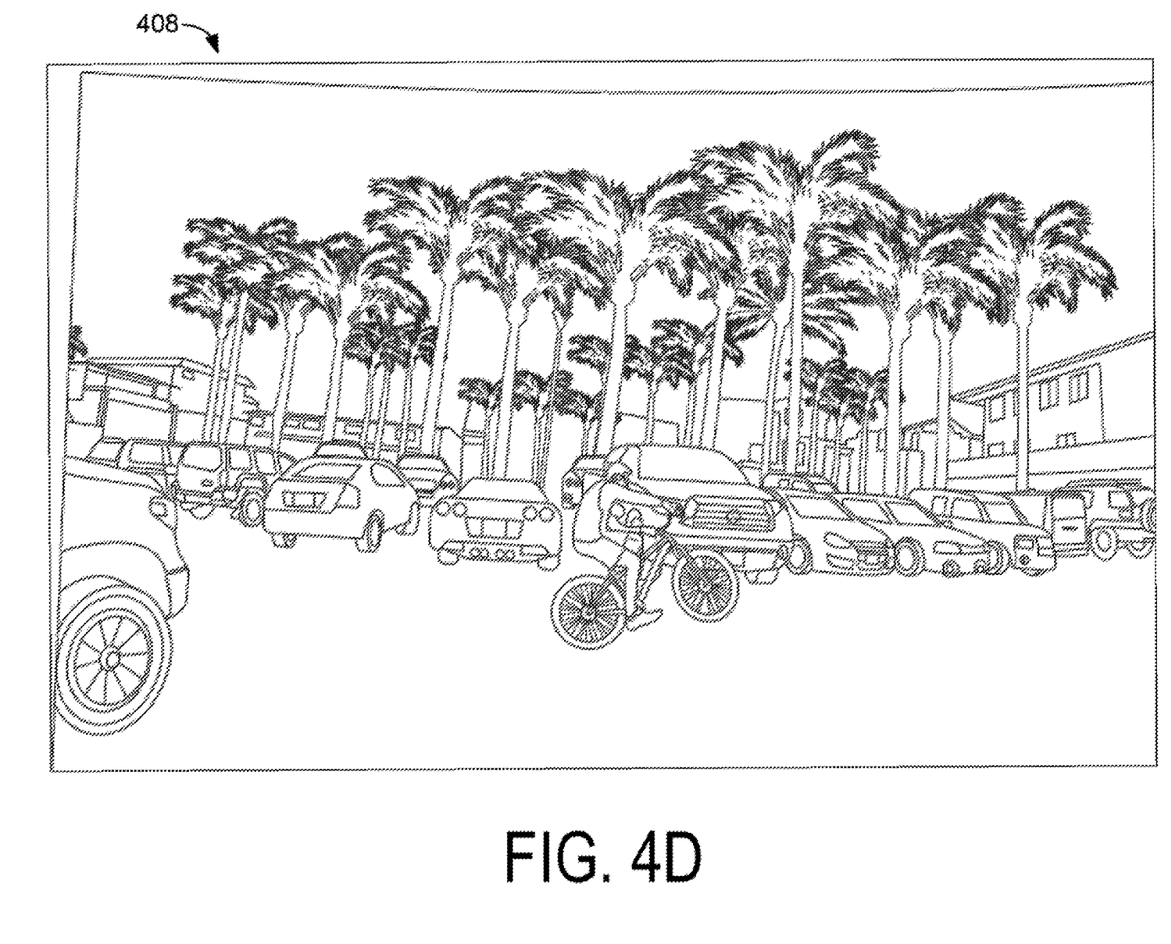
FIG. 4D illustrates an example embodiment of a stabilized image.

Using the process described above, a target image may be aligned to a reference image as shown in FIGS. 4A-D. FIG. 4A illustrates an example reference image 402 and FIG. 4B illustrates an example target image 404 for aligning to the reference image. 402 As can be seen, the images have substantial overlap, but a foreground object (the bicycle) has moved significantly between the reference image 402 and the target image 404, and some camera motion has been introduced. FIG. 4C illustrates an annotated target image 406 with feature tracks overlaid on the target image 404 that track movement of features from the reference image 402 to the target image 404. As can be seen, a large number of feature tracks are of approximately the same length (shown in solid lines). These feature tracks will generally be clustered together and may represent movement due to the camera motion. A few feature tracks have significantly varied lengths (shown in dashed lines) and may represent movement of foreground objects or incorrectly tracked features. FIG. 4D shows a repointed image 408 after applying the estimated rotation to the target image 404 to substantially align the background features to the reference image 402. In an embodiment, a difference image may be generated between the repointed target image 408 and the reference image 402 by taking pixel-wise differences. This difference image can be used to identify the parts of the images that are not well aligned (e.g., pixels in the difference image above a threshold). These non-aligned portions may correspond to foreground motion. Thus, for example, foreground/background segmentation may be achieved by separating the difference image into pixels having an above-threshold difference (corresponding to the foreground) and pixels having a below-threshold difference (corresponding to the background).

Composite Images

Figure 5:
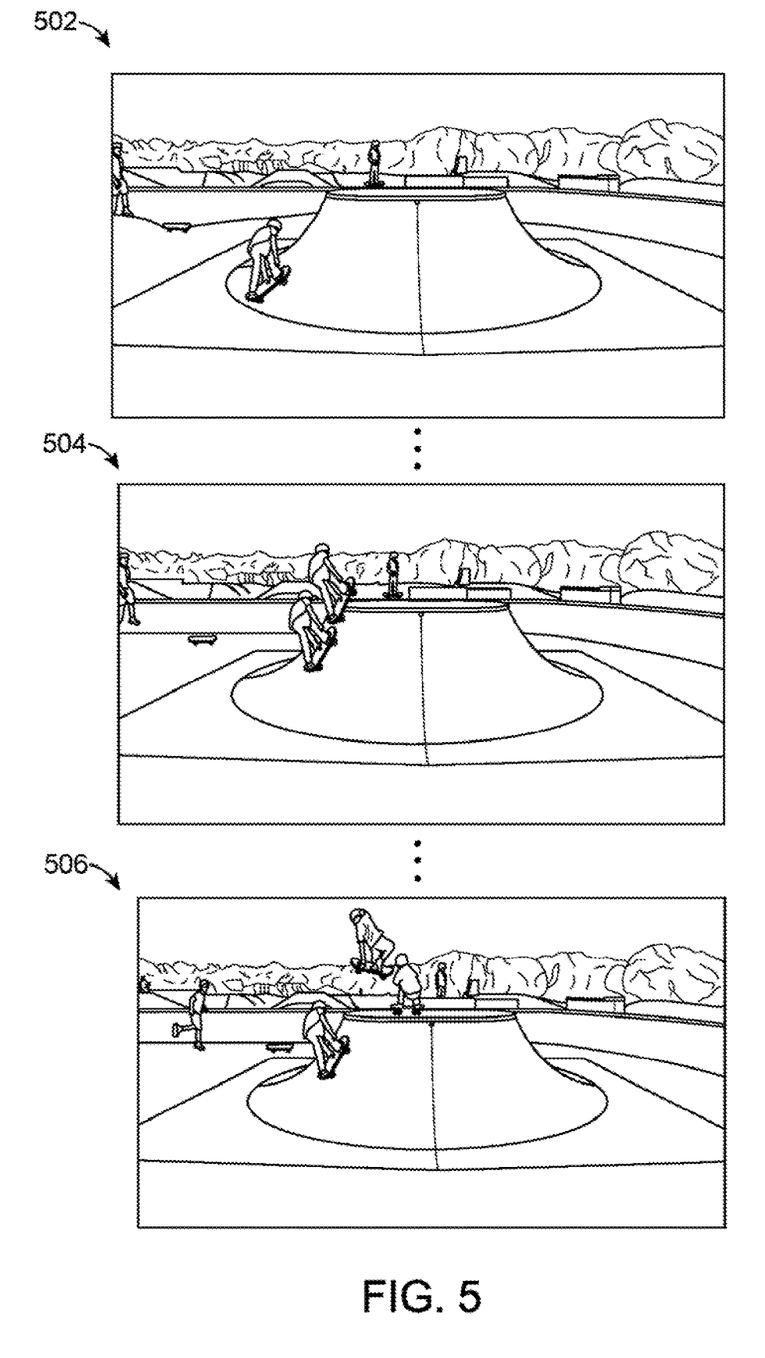
FIG. 5 illustrates an example embodiment of a composite image sequence.

Using the foreground/background segmentation technique discussed above, composite images or video may be generated. Here, a foreground object in a given frame is separated from the background and then overlaid onto subsequent frames of video. This creates an effect of tracking a path of a moving foreground object. An example sequence of composite image frames 502, 504, 506 is illustrated in FIG. 5. As can be the skateboarder is "frozen" at various instances in the sequence of video frames so as to depict the skateboarder's path through the scene.

Video Stabilization

Another application of the above described algorithm may be video stabilization. In an example video stabilization process, camera paths between a reference frame and each of a sequence of target frames is first estimated, which may be determined by the respective estimated rotation matrices. Then, a smoothed camera path is generated. The smoothing may apply a filter to the estimated sequence of rotation matrices so as to retain large camera motion likely to correspond to intentional panning or re-orienting, while removing small camera motion likely to correspond to unintentional shaking of the camera. For example, in an embodiment, an averaging filter or a Kalman filter may be applied.

ADDITIONAL CONFIGURATION CONSIDERATIONS

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for the described embodiments as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the scope defined in the appended claims.

The invention claimed is:

1. A method for aligning a target image to a reference image in the presence of lens distortion, the method comprising:

receiving the target image and the reference image;

detecting a first plurality of visual features appearing in the target image at first image feature coordinates in a two-dimensional image space, and a corresponding second plurality of visual features appearing in the reference image at second image feature coordinates in the two-dimensional image space;

transforming the first image feature coordinates and the second image feature coordinates from the two-dimensional image space to a three-dimensional spherical space to generate respective first spherical feature coordinates and second spherical feature coordinates;

applying a rotation to the target image in the three-dimensional spherical space to generate a rotated target image by at least:
    determining at least a subset of the first spherical feature coordinates and a corresponding subset of the second spherical feature coordinates as background features in the target image and the reference image, respectively;
    determining feature tracks representing a distance along a spherical arc and direction from the first spherical feature coordinates to a corresponding one of the second spherical feature coordinates;
    clustering the feature tracks by length to determine a plurality of feature track clusters; and
    determining, from the plurality of feature track clusters, a background cluster of feature tracks corresponding to the background features; and
inverse transforming the rotated target image to the two-dimensional image space.

2. The method of claim 1, wherein the determining of the background cluster comprises:
    determining a predefined number of largest clusters from the plurality of feature track clusters;
    determining weighted averages of track lengths in each of the largest clusters; and
    selecting a cluster having a shortest weighted average of the weighted averages.

3. The method of claim 1, wherein the applying of the rotation further comprises:
    determining first three-dimensional Cartesian coordinates corresponding to the subset of the first spherical feature coordinates and second three-dimensional Cartesian coordinates corresponding to the subset of the second spherical feature coordinates;
    determining a first coordinate centroid of the first three-dimensional Cartesian coordinates and a second coordinate centroid of the second three-dimensional Cartesian coordinates;
    determining first translated coordinates as a difference between the first three-dimensional Cartesian coordinates and the first coordinate centroid, and second translated coordinates as a difference between the second three-dimensional Cartesian coordinates and the second coordinate centroid;
    determining products between each of the first translated coordinates and respective corresponding second translated coordinates;
    determining an accumulation matrix as a combination of the products; and
    applying a singular value decomposition to the accumulation matrix to determine a rotation matrix, the rotation matrix indicating the rotation to apply to the target image in the three-dimensional spherical space.

4. The method claim 1, further comprising capturing the target image and the reference image with a lens having lens distortion parameters, the lens distortion parameters corresponding to a fisheye lens that introduces curvature into straight lines in a scene near edges of a captured image.

5. The method of claim 1, wherein the applying of the rotation further comprises optimally aligning the subset of the first spherical feature coordinates to the corresponding subset of the second spherical feature coordinates based on an optimization metric.

6. The method of claim 1, further comprising storing the lens distortion parameters within the target image and the reference image.

7. The method of claim 1, further comprising determining from the plurality of feature track clusters a foreground object that is distinct from the background features.

8. A non-transitory computer-readable apparatus comprising a computer program configured to align a target image to a reference image in the presence of lens distortion, the computer program comprising instructions that, when executed by a processor apparatus, cause the processor apparatus to:
    receive the target image and the reference image;
    detect a first plurality of visual features appearing in the target image at first image feature coordinates in a two-dimensional image space, and a corresponding second plurality of visual features appearing in the reference image at second image feature coordinates in the two-dimensional image space;
    transform the first image feature coordinates and the second image feature coordinates from the two-dimensional image space to a three-dimensional spherical space to generate respective first spherical feature coordinates and second spherical feature coordinates;
    apply a rotation to the target image in the three-dimensional spherical space to generate a rotated target image via at least:
        determination of at least a subset of the first spherical feature coordinates and a corresponding subset of the second spherical feature coordinates as background features in the target image and the reference image, respectively;
        determination of feature tracks representing a distance along a spherical arc and direction from the first spherical feature coordinates to a corresponding one of the second spherical feature coordinates;
        cluster the feature tracks by length to determine a plurality of feature track clusters; and
        determine, from the plurality of feature track clusters, a background cluster of feature tracks corresponding to the background features; and
    inverse transform the rotated target image to the two-dimensional image space.

9. The non-transitory computer-readable apparatus of claim 8, wherein the determination of the background cluster further comprises:
    determination of a predefined number of largest clusters from the plurality of feature track clusters;
    determine weighted averages of track lengths in each of the largest clusters; and
    select a cluster having a shortest weighted average of the weighted averages.

10. The non-transitory computer-readable apparatus of claim 8, wherein the application of the rotation further comprises:
    a determination of first three-dimensional Cartesian coordinates corresponding to the subset of the first spherical feature coordinates and second three-dimensional Cartesian coordinates corresponding to the subset of the second spherical feature coordinates;
    determine a first coordinate centroid of the first three-dimensional Cartesian coordinates and a second coordinate centroid of the second three-dimensional Cartesian coordinates;
    determine first translated coordinates as a difference between the first three-dimensional Cartesian coordinates and the first coordinate centroid, and second translated coordinates as a difference between the second three-dimensional Cartesian coordinates and the second coordinate centroid;

determine products between each of the first translated coordinates and respective corresponding second translated coordinates;

determine an accumulation matrix as a combination of the products;

apply a singular value decomposition to the accumulation matrix to determine a rotation matrix, the rotation matrix indicating the rotation to apply to the target image in the three-dimensional spherical space.

11. The non-transitory computer-readable apparatus of claim 8, wherein the target image and the reference image are captured with a lens having lens distortion parameters, the lens distortion parameters corresponding to a fisheye lens that introduces curvature into straight lines in a scene near edges of a captured image.

12. The non-transitory computer-readable apparatus of claim 8, wherein the application of the rotation comprises optimal alignment of the subset of the first spherical feature coordinates to the corresponding subset of the second spherical feature coordinates based on an optimization metric.

13. The non-transitory computer-readable apparatus of claim 8, wherein the determination of the background cluster comprises a determination of the plurality of feature track clusters having a cluster that has a largest size.

14. The non-transitory computer-readable apparatus of claim 8, wherein the instructions are configured to, when executed by the processor apparatus, further apply a translation to the target image in the three-dimensional spherical space to generate the rotated target image.

15. A video server comprising:
one or more processors; and
a non-transitory computer-readable apparatus comprising a computer program configured to align a target image to a reference image in the presence of lens distortion, the computer program comprising instructions that, when executed by the one or more processors, causes the one or more processors to:
receive the target image and the reference image;
detect a first plurality of visual features appearing in the target image at first image feature coordinates in a two-dimensional image space, and a corresponding second plurality of visual features appearing in the reference image at second image feature coordinates in the two-dimensional image space;
transform the first image feature coordinates and the second image feature coordinates from the two-dimensional image space to a three-dimensional spherical space to generate respective first spherical feature coordinates and second spherical feature coordinates;
apply a rotation to the target image in the three-dimensional spherical space to generate a rotated target image via at least:
determination of at least a subset of the first spherical feature coordinates and a corresponding subset of the second spherical feature coordinates as background features in the target image and the reference image, respectively;
determination of feature tracks representing a distance along a spherical arc and direction from the first spherical feature coordinates to a corresponding one of the second spherical feature coordinates;
cluster the feature tracks by length to determine a plurality of feature track clusters; and
determine, from the plurality of feature track clusters, of a background cluster of feature tracks corresponding to the background features; and
inverse transform the rotated target image to the two-dimensional image space.

16. The video server of claim 15, wherein the determination of the background cluster comprises:
determination of a predefined number of largest clusters from the plurality of feature track clusters;
determination of weighted averages of track lengths in each of the largest clusters; and
selection of a cluster having a shortest weighted average of the weighted averages.

17. The video server of claim 15, wherein the application of the rotation further comprises:
determination of first three-dimensional Cartesian coordinates corresponding to the subset of the first spherical feature coordinates and second three-dimensional Cartesian coordinates corresponding to the subset of the second spherical feature coordinates;
determine a first coordinate centroid of the first three-dimensional Cartesian coordinates and a second coordinate centroid of the second three-dimensional Cartesian coordinates;
determine first translated coordinates as a difference between the first three-dimensional Cartesian coordinates and the first coordinate centroid and second translated coordinates as a difference between the second three-dimensional Cartesian coordinates and the second coordinate centroid;
determine products between each of the first translated coordinates and respective corresponding second translated coordinates;
determine an accumulation matrix as a combination of the products; and
application of a singular value decomposition to the accumulation matrix to determine a rotation matrix, the rotation matrix being configured to indicate the rotation to apply to the target image in the three-dimensional spherical space.

18. The video server of claim 15, wherein the application of the rotation further comprises an alignment of the subset of the first spherical feature coordinates to the corresponding subset of the second spherical feature coordinates based on an optimization metric.

19. The video server of claim 15, wherein the video server is configured to be in data communication with one or more of a camera device and a client device via a network.

20. The video server of claim 15, wherein the instructions are further configured to, when executed by the one or more processors, cause the one or more processors to extract lens distortion parameters from one or more of the target image and the reference image.

* * * * *